Figure 1:
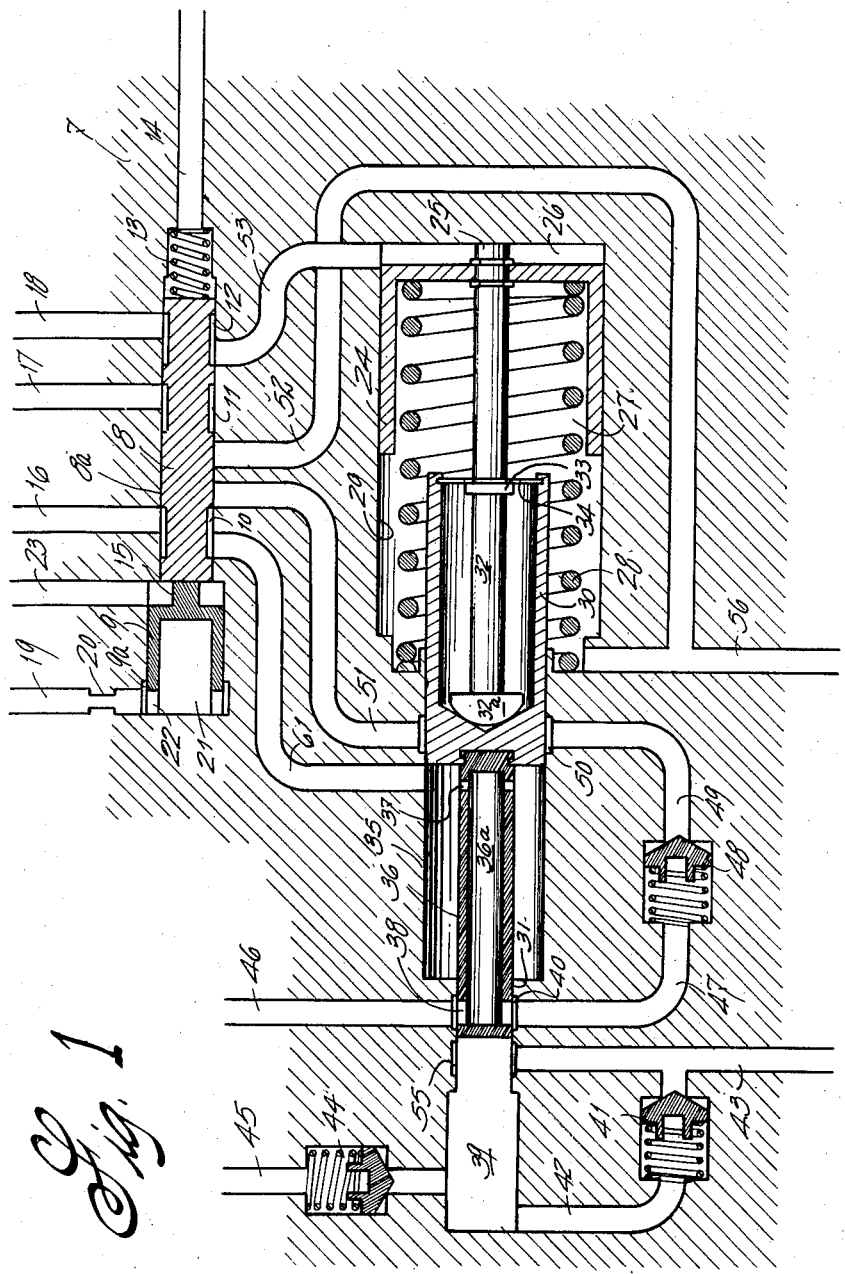

Aug. 18, 1959

C. O. BRODERS ET AL 2,899,798

IGNITER CONTROL

Filed July 31, 1957

3 Sheets-Sheet 1

INVENTOR.
CLAUDE O. BRODERS
WILLIAM W. JACOBUS
BY ARTHUR B. SWENSON

ATTORNEYS

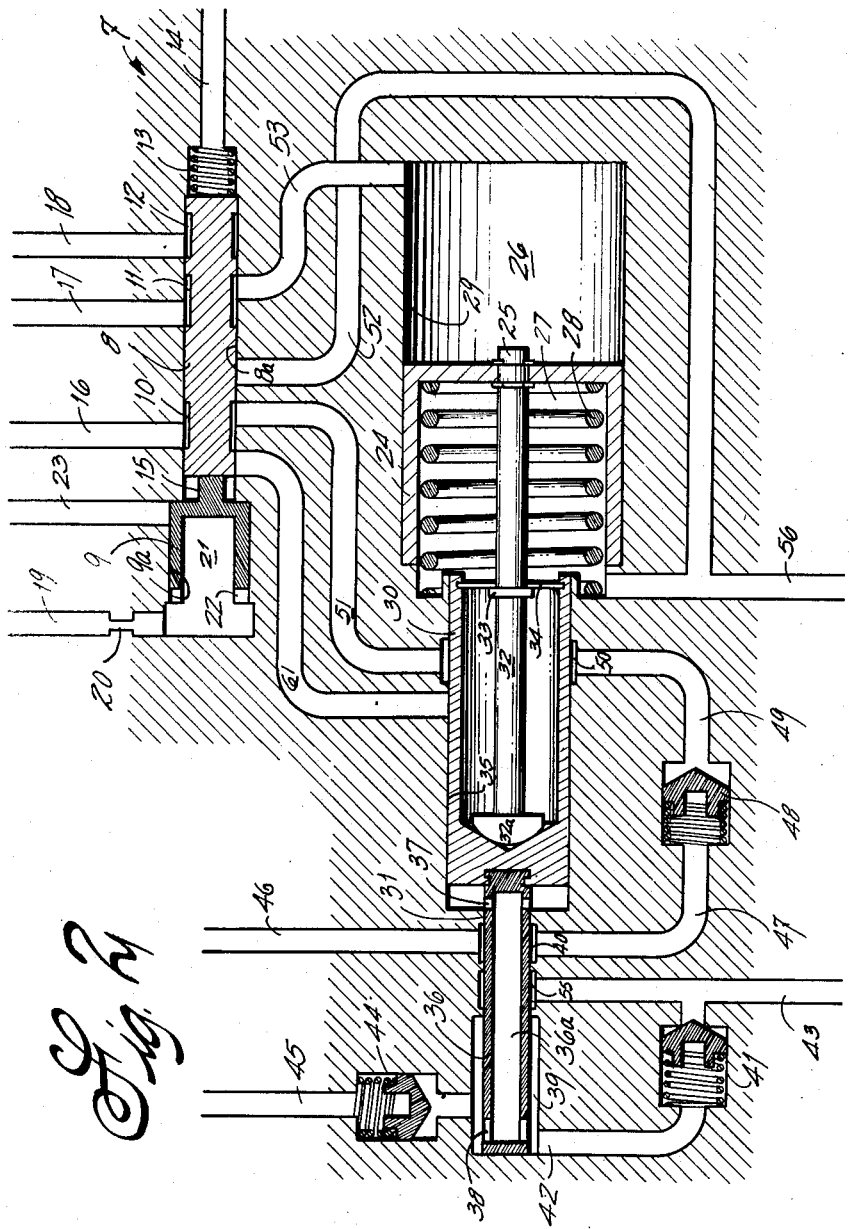

Aug. 18, 1959     C. O. BRODERS ET AL     2,899,798
IGNITER CONTROL
Filed July 31, 1957                                              3 Sheets-Sheet 3
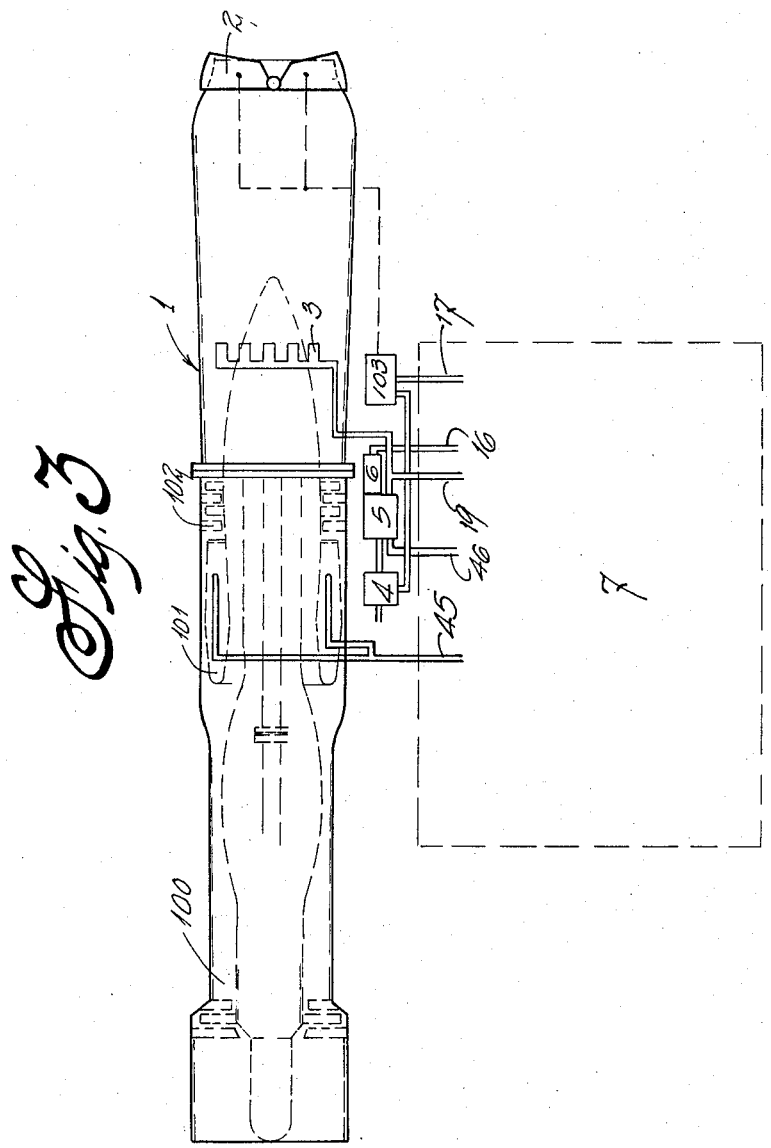
INVENTOR.
CLAUDE O. BRODERS
WILLIAM W. JACOBUS
BY ARTHUR B. SWENSON
ATTORNEYS

United States Patent Office 2,899,798
Patented Aug. 18, 1959

2,899,798

IGNITER CONTROL

Claude O. Broders, Simsbury, William W. Jacobus, Columbia, and Arthur B. Swenson, Glastonbury, Conn., assignors, by mesne assignments, to the United States of America as represented by the Secretary of the Navy Application July 31, 1957, Serial No. 675,506

1 Claim. (Cl. 60—35.6)

This invention relates to an afterburner fuel control; more specifically, it pertains directly to a signal shot fuel injection control to inject into the combustion chamber of an aircraft engine a high pressure squirt of fuel for igniting the main afterburner fuel stream.

It is an object of this invention therefore to provide an ignition control which provides for an additional squirt of fuel at the start of afterburner operation.

It is a further object of this invention to provide an ignition control which has its moving parts lubricated and cooled by fuel.

It is a further object of this invention to provide an afterburner ignition control which is operated as a function of afterburner fuel pressure and of the air pressure used in the control of the variable area exhaust nozzle.

These and other objects will be readily apparent to those skilled in the art from an examination of the following description and attached drawings wherein:

Figure 1 is a cross-sectional view of the afterburner control, in non-afterburning condition, Figure 2 is a similar view but with the control in afterburning position after the added fuel has been injected to the engine combustion chamber, and Figure 3 shows the afterburner control of the previous two figures relative to an aircraft engine.

Referring to Figure 3, an aircraft engine 1 has the conventional compressor 100, combustion chamber 101, and turbine 102 mounted therein; in the exhaust section, an afterburner fuel manifold 3 traverses the cross-section of the exhaust section. The manifold is of conventional design and is fed fuel from a fuel booster pump 5; fuel booster pump 6 circulates fuel for purposes to be described later; the operation of the pumps is controlled by the hydraulic controls 4 which also regulate the operation of the air motor 103 which operates the variable area segments 2 at the exhaust outlet of the power plant. The structure recited, per se, is well known in the art.

The igniter control 7 comprises a cylindrical bore 8a having a valve spindle 8 slidable therein. The passage 8a terminates at one side in a pressure relief bore 14 and at the opposite end in a large cylindrical bore 9a having a piston valve 9 therein. Valve spindle 8 has annular grooves 10, 11, 12 which provide communication through the valve for the various control pressures described herein.

The valve body 9 has a nipple 15 at one end thereof which abuts the spindle 8 at all times; spring 13 maintains the nipple 15 and spindle 8 in contact.

Valve 9 is of cup piston form having a central cavity 21 therein and ports 22 in the walls of the cup to provide communication between conduit 19, which is connected to the afterburner fuel manifold pressure, and the cavity 21. An orifice 20 in the conduit 19 regulates the flow of fuel into the cavity during afterburning operation. Adjacent the nipple end of the valve 9 and bore 9a, a conduit 23 provides for a vent allowing relatively free movement of body 9 between its several control positions.

Centrally located in the casing 7 is a bore 29 closed off at one end and at the opposite end terminating in a smaller bore 35. A cup-shaped piston 24 is slideable in the large bore 29 with the open end 27 of the cup piston 24 facing the smaller bore 35; similarly a second cup shaped piston 30 is slidable in the bore 35 with its open end facing the valve 24. The two pistons 24 and 30 are interconnected by a rod 32 which is secured at one end to the bottom end of the piston 24 and has a rounded tip portion 32a which abuts the cavity bottom of piston 30; a retainer 34 secured to piston 30 mates with flange 33 on the rod to maintain the rod in position.

Spring 28 urges piston 24 to the right at all times; due to the interconnection of pistons 24 and 30 by rod 32, piston 30 is urged in a similar direction. One or more nipples 25 on the one side of piston 24 abut against the wall of bore 29 to prevent vacuuming by forming a chamber 26 between the piston and the bore.

Bore 35 leads into a still smaller bore 31 which leads to a cavity 39 at one end of the housing 7. A cup shaped or sleeve valve 36 slides in bore 31 and is secured to the work face of piston 30. Ports 37 in the wall of the sleeve provide communication between bore 35 and the inner cavity 36a of the valve.

Groove 10 of valve 8 is always directly connected to conduit 16 which is connected to fuel booster pump 6; the groove, depending on its control position, directs fuel either into conduit 51 or conduit 61 within the housing 7. The latter leads directly into bore 35 when the control unit is in its "stand-by" or inoperative position, i.e. no afterburning. The former conduit, on the other hand, leads into an annulus 50 in the wall of bore 35; the positioning of this annulus is such that the wall of piston 30 always covers it regardless of piston position.

Depending upon the positioning of valve 8, internal conduit 53 interconnects chamber 26 with either groove 11 or groove 12 while conduit 17, connected to the variable area air motor control 103, is always coupled to groove 11; vent conduit 18 is always coupled to groove 12. Drain conduit 52 has always a body portion of valve 8 sliding over it; the conduit is connected to a second drain conduit 56 which leads from bore 29.

Referring back to sleeve 36 and bore 35, ports 38 are formed in the wall section of the sleeve valve 36; when the valve is in its non-afterburning position, the ports communicate with an annulus 40 in the wall of bore 31. Fuel return line 46 leads from the annulus back to the pump 5; a second conduit 47 also leads away from the annulus 40 into conduit 49 via check valve 48; the latter conduit leads directly into annulus 50 around bore 35.

Cavity 39 feeds fuel into squirt line 45 which injects afterburner igniter fuel into the main combustion chamber; check valve 44 prevents combustion gases from entering cavity 39 when the control unit is in non-afterburning position. A second conduit 42 leads away from cavity 39 into a check valve 41 which has its opposite side connected to a drain vent 43. The vent is also coupled to an annulus 55 circumventing bore 31.

*Operation*

In the non-afterburning position (Figure 1), since the afterburner is idle, no fuel flows in conduit 19 and orifice 20 and cavity 21; consequently, the force of spring 13 forces valves 8 and 9 to the left. Fuel from booster pump 6 flows into conduit 61 via land 10 filling bores 35 and 36a, via sleeve ports 37. The fuel in conduit 47 places check valve 48 in its closed position; fuel flows through ports 38, annulus 40, conduit 46 and back to the inlet side of pump 5. Fuel also enters conduit 47 closing check valve 48; this is necessary to prevent any side loading on pilot valve 8 via conduits 49, 51.

The valve 8 in its non-afterburning position cuts off any flow to conduit 51; drain conduit 52 directs leakage flow around valve 8 to drain vent 56.

It is evident therefore that the flow of fuel in the non-afterburning position is to keep bore 35 supplied with fuel and to cool certain sections of the unit 7 through a continuous flow action.

Simultaneous with such operation, conduit 53 is coupled to vent 18 via groove 12 thus rendering any pressures in conduit 17 and groove 11 ineffective.

The pressure of the fuel in bore 35 urges piston 30 to the right; this force together with the action of spring 28 on piston 24 maintains the coupled pistons in the extreme right position.

In the afterburning condition (Figure 2), control 4 is operated to allow fuel from pump 5 to enter manifold 3; simultaneous with such action, control 4 operates motor 103 to operate members 2 at the jet exhaust. Since fuel now enters manifold 3, conduit 19, being coupled with the manifold, has fuel flowing therein; a controlled rate of fuel passes orifice 20 filling chamber 21 thereby urging valve 8, through contact of valve 8 with nipple 15, to the right against the action of spring 13.

Air pressure from motor 103 enters conduit 17, groove 11, internal conduit 53 and cavity 26. This increased pressure in the cavity forces piston 24 to the left and, at the same time, forces piston 30 to the left. Upon movement of piston 30, fuel is ejected from within bore 35, cavity 36a and out ports 38 into cavity 39 when such ports have cleared the walls of bore 31. After cavity 39 becomes filled, further movement of the valve 36 forces fluid into conduit 42 and squirt line 45. Valve 41 is closed preventing fuel from entering drain 43; valve 44 is opened allowing additional fuel to be injected into the main combustion chamber at a relatively high pressure. Upon completion of the stroke, no more hi-pressure fuel is added to the afterburner as long as the afterburner is in operation; consequently, the instant device is of the "single shoe" type.

Conduit 52 leads leakage fuel away from valve 8 to drain 56, same as it did when the control was in the non-afterburning position.

Booster pump fuel in conduit 16 gradually is transferred from feeding conduit 61 to feeding conduit 51 during the travel of valves 8 and 9. The fuel now enters annulus 50 from conduit 51, fills conduit 49, opens check valve 48 and returns to the pump via return conduit 46. It is thus seen that in this latter condition of the controls, the fuel from the booster pump acts to lubricate, cleanse, and cool piston 30.

As noted, the single shot injector remains in the position just described as long as the afterburner is on. When the afterburner is turned off, spring 13 urges valves 8 and 9 to the left as the fuel pressure in cavity 21 starts to decrease. Conduit 53 is connected to vent via groove 12 and the pressure in chamber 26 drops. This drop in pressure permits spring 28 to force pistons 24, 30 and 36 to the right thereby creating a drop in pressure in cavity 39. With this pressure drop, pressure fluid from conduit 43 opens valve 41 and maintains cavity 39 at this pressure, which may be atmospheric if so desired. Valve 44, which closed upon the completion of the injector stroke, remains closed as this added pressure is insufficient to overcome the spring bias against valve 44.

Drain conduit 56 continues to take any fuel leakage around pistons 24 and 30. Passage 14 leading into valve 8 prevents vacuuming of the valve in the chamber housing spring 13; at the same time, it prevents any pressure build-up of air or fuel in this chamber when valve 8 is moved to the right, or afterburning position.

It will be noted that in the operation of the igniter, there is a delay action occurring to insure proper ignition in that (a) the afterburner fuel manifold must be filled before the instant igniter can be actuated, (b) a large volume (21) is provided to be filled behind the pilot valve before actuation can occur, and (c) there is a jet or orifice (20) placed in the line of the pilot valve to further slow down operation.

Obviously many modifications and variations of the present invention are possible in the light of the above teachings. It is therefore to be understood that within the scope of the appended claim the invention may be practiced otherwise than as specifically described.

What is claimed is:

In a gas turbine power plant having a source of afterburner fuel manifold pressure, a source of fluid pressure, a combustion chamber and a source of fuel, a fuel booster device for supplying a predetermined amount of fuel to said combustion chamber comprising, a cylinder having a piston therein dividing said cylinder into a fuel chamber and a fluid pressure chamber, a pilot valve, a restricted inlet means connecting said source of afterburner fuel manifold pressure to said pilot valve for actuation thereof, a first fuel inlet means normally connecting said source of fuel through said pilot valve to said fuel chamber, said cylinder having an annular groove covered at all times by said piston, a second fuel inlet means connecting said source of fuel through said pilot valve to said cylinder at said annular groove upon actuation of said pilot valve, said cylinder having a first outlet means connecting said annular groove and said fuel chamber to said source of fuel and a second fuel outlet means connecting said fuel chamber to said combustion chamber, a sleeve valve operatively connected with said piston for alternatively connecting said fuel chamber with each of said outlets, said sleeve valve normally connecting said fuel chamber through said first outlet to said fuel source, a fluid pressure passage means connecting said source of fluid pressure to said fluid pressure chamber through said pilot valve upon actuation of said pilot valve, whereby fuel is normally circulated through said fuel chamber from said fuel source and on operation of said pilot valve fluid pressure is introduced to said fluid pressure chamber actuating said piston and sleeve valve thereby to displace fuel from said fuel chamber through said second outlet into said combustion chamber and placing said source of fuel in communication with said annular groove and said first outlet to lubricate, cool and cleanse said piston.

References Cited in the file of this patent

UNITED STATES PATENTS

| | | |
|---|---|---|
| 2,219,199 | Renner | Oct. 22, 1940 |
| 2,640,316 | Neal | June 2, 1953 |
| 2,819,587 | Coar | Jan. 14, 1958 |